US010860675B2

(12) United States Patent
Ashby

(10) Patent No.: US 10,860,675 B2
(45) Date of Patent: Dec. 8, 2020

(54) INFORMATIONAL TABS

(71) Applicant: Oracle International Corporation, Redwood Shores, CA (US)

(72) Inventor: Alan Bradley Ashby, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 173 days.

(21) Appl. No.: 14/491,601

(22) Filed: Sep. 19, 2014

(65) Prior Publication Data

US 2016/0085428 A1 Mar. 24, 2016

(51) Int. Cl.
*G06F 3/048* (2013.01)
*G06F 16/957* (2019.01)
*G06F 16/958* (2019.01)
*G06F 3/0481* (2013.01)

(52) U.S. Cl.
CPC ........ *G06F 16/9577* (2019.01); *G06F 3/0481* (2013.01); *G06F 16/958* (2019.01)

(58) Field of Classification Search
CPC .......... G06F 17/3089; G06F 17/30873; G06F 17/30905; G06F 16/9577; G06F 16/958; G06F 3/0481
USPC ....................................................... 715/255
See application file for complete search history.

(56) References Cited

U.S. PATENT DOCUMENTS 6,266,060 B1* 7/2001 Roth ...................... G06F 3/0482
715/206
8,516,364 B2* 8/2013 Demant ................. G06F 3/0484
715/247
9,317,621 B2* 4/2016 French ............. G06F 17/30899
2005/0005235 A1* 1/2005 Satterfield ............. G06F 17/211
715/245
2006/0020904 A1* 1/2006 Aaltonen ................ G06F 3/048
715/850
2006/0123353 A1* 6/2006 Matthews ............. G06F 3/0481
715/779
2009/0164887 A1* 6/2009 Ikegami .............. G06F 16/9577
715/247
2010/0159967 A1* 6/2010 Pounds .................... H04L 51/14
455/466
2012/0284245 A1* 11/2012 Portnoy ............ G06F 17/30867
707/706
2014/0075380 A1* 3/2014 Milirud ................. G06F 11/323
715/810
2014/0075384 A1* 3/2014 Kritt .................... G06F 3/04817
715/811

(Continued)

*Primary Examiner* — Stephen S Hong
*Assistant Examiner* — Hope C Sheffield
(74) *Attorney, Agent, or Firm* — Trellis IP Law Group, PC

(57) ABSTRACT

A system and method for facilitating organization of and access to information and functionality in a computing environment. An example method includes organizing content to be accessible via a User Interface (UI) display screen into one or more pages; displaying one or more tabs pertaining to each of the one or more pages; and providing, in one or more of the tabs, content characterizing each of the one or more pages. The content includes one or more dynamically updated elements, which may include one or more dynamically updated elements arranged in plural lines of information. The content may further include dynamic information and/or functionality represented via a visualization or UI control.

19 Claims, 7 Drawing Sheets

(56) References Cited

U.S. PATENT DOCUMENTS

2014/0108968 A1\* 4/2014 Vishria ............ G06F 17/30867
715/760

\* cited by examiner

INFORMATIONAL TABS

BACKGROUND

The present application relates to software and more specifically to User Interfaces (UIs), methods, and accompanying systems for accessing, organizing, and presenting data and/or functionality.

Methods for organizing displayed data and/or functionality via a UI display screen and for facilitating navigation thereof are employed in various demanding applications, including software UIs for networked enterprise applications, websites, desktop application UI's, mobile application UIs, tabbed browsers, and so on. Such applications often demand space efficient and illustrative mechanisms for facilitating identifying associated content and for organizing UI display screen features.

Conventionally, to facilitate organizing and accessing information via a UI display screen, various mechanisms, such as tabs, tiles, hyperlinks, and so on, may be employed. For example, tabs may enable rapid switching between UI display screens and associated data and functionality accessible via the screens.

However, conventionally, such mechanisms can be relatively cumbersome and/or non-informative, making inefficient use of screen space. This can be particularly problematic for mobile applications, where device display size is often limited.

SUMMARY

An example method for facilitating user access to information and functionality in a computing environment includes organizing content to be accessible via a user interface display (UI) screen into one or more pages; displaying one or more tabs pertaining to each of the one or more pages; and providing, in one or more of the tabs, content (i.e., tab content) characterizing each of the one or more pages, wherein the content includes one or more dynamically updated elements that may be arranged in plural lines of information.

In a more specific embodiment, the tab content includes dynamic information represented via one or more visualizations. The tab content further includes one or more UI controls (called tab UI controls) that are adapted to provide user access to software functionality applicable to a page. Such UI controls may be dynamically updated elements.

The example method may further include analyzing or monitoring content of a page (i.e., page content) to determine changed content based on the analyzing or sensing. Any changed content may then be prioritized in accordance with one or more metrics, such as a metric representing usage frequency of a UI control of the page that includes the changed content.

The prioritizing may further include ranking items of content of a page. The one or more tab UI controls displayed in the one or more information tabs may represent (or otherwise offer similar functionality as) a UI control of the page that has been most frequently used or most recently used during a predetermined interval.

The tab content may further include page metadata characterizing or describing each of the one or more pages. The metadata may include page content summary information pertaining to a page associated with an information tab. Another example of page metadata includes page position information indicating a most recently viewed section of a page. A tab may include one or more UI controls that provide a link to a portion or section of a page corresponding to the most recently displayed or accessed section of the page.

The tab content may include a visualization, such as a graph, chart, or other visualization, that is adapted to selectively update in response to changes in data that underlies a page associated with an information tab. The visualization may act as a UI control, such that, for example, user selection of the visualization results in display of a section of the associated page that is associated with the visualization.

Analysis of page content, in preparation of adjustments to one or more associated information tabs, may include estimation of which UI controls of a page are used more frequently than other UI controls of the page. A UI control may be selected from among frequently used UI controls for inclusion in an associated information tab. Hence, frequently used operations of a page, nut just data or dynamic data, may be readily accessible via the information tab. Such operations associated with a selected UI control may represent dynamic operations or UI controls that may be adjusted in accordance with page usage and access information and/or in accordance with other metadata associated with a page.

In an illustrative embodiment, the one or more tabs include plural horizontally or vertically arranged information tabs. The tabs may include features for detecting user selection of a tab and then displaying a visual indicator that indicates that a tab has been selected, while also displaying a page associated with the selected tab. The visual indicator may include a highlighting of the selected tab or portion thereof.

Hence, certain embodiments discussed herein are adapted to augment tabs with pertinent information and/or functionality (based on predetermined prioritization criteria), which may be dynamic or static, of pages associated with the tabs. Incorporation of relevant page information (or representations of page information) in an information tab associated with the page may obviate certain page traversals, reduce navigation hops to desired content, and generally increase user accessibility and immediacy of important information, which can be particularly important for mobile applications.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. The terms "enterprise software" and "enterprise application" may be employed interchangeably herein. However, an enterprise application may include one or more enterprise software modules or components, such as User Interface (UI) software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, Internet Service Providers (ISPs), class loaders, bytecode compliers, and so on, are not explicitly called out in the figures. However, those skilled in the art with access to the present teachings will know which components to implement and how to implement them to meet the needs of a given implementation.

Figure 1:
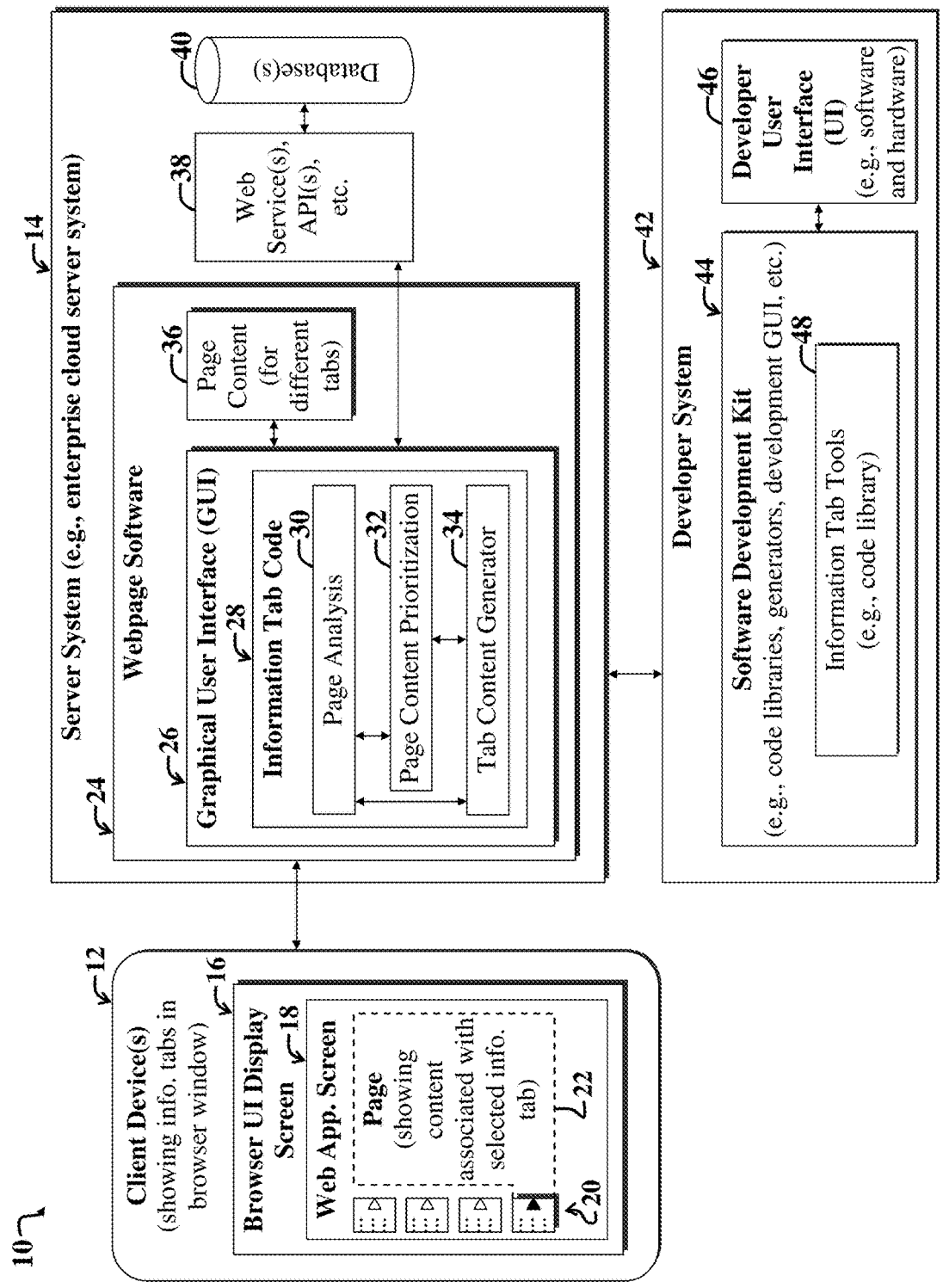
FIG. 1 is a diagram illustrating an example embodiment of an enterprise system incorporating information tab software.

FIG. 1 is a diagram illustrating an example embodiment of an enterprise system 10 incorporating information tab software 24, 48 and associated UI display screens 18 that utilize information tabs 20.

Note that the system 10 presents a particular example implementation, where computer code for implementing embodiments is implemented at least in part on a server. However, embodiments are not limited thereto. For example, a client-side software application may implement information tabs in accordance with the present teachings without requiring communications between the client-side software application and a server.

In general, groupings of various modules of the system 10 are illustrative and may vary, e.g., certain modules may be combined with other modules or implemented inside of other modules, or the modules may otherwise be distributed differently among a network or within one or more computing devices, without departing from the scope of the present teachings.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or page. Pages may include sections, such as sub-views or sub-windows, dialog boxes, graphs, tables, other UI display screens, and so on. In certain cases, a UI display screen may refer to all application windows presently displayed on a display.

A tab may be any UI feature wherein the UI feature is adapted to trigger display of a UI display screen associated with the tab in response to user selection thereof, and wherein any non-selected tabs may persist in a UI display screen that incorporates the selected tab. A UI display screen or page is said to be associated with a tab if user selection thereof results in display of the UI display screen or page.

Accordingly, tabs are often employed as user selectable indicators and navigation mechanisms for UI display screens associated with the tabs. Hence, such a tab may act as a page marking and access mechanism, which facilitates both marking or otherwise identifying a page or associated UI display screen, and which may further provide a mechanism that facilitates access to, e.g., by enabling navigation to, the identified or marked page in response to user selection of the tab.

Navigation may refer to any process whereby a UI display screen is updated to reveal different data and/or a different configuration of UI elements in a display screen. Navigation may also include replacing a given UI display screen, which may be referred to herein as navigating away from the replaced UI display screen.

Information tabs may be arranged in columns and/or rows with other tabs in a UI display screen. The arranged tabs may persist upon user selection of different tabs of the arrangement, such that the tabs or portions thereof remain visible during user selection of other displayed tabs.

An information tab may be a particular type of tab, i.e., may be any tab that includes information or UI controls in addition to or other than merely a label or name for content represented by the tab. The terms "information tab," "info tab," and "informational tab" may be employed interchangeably herein.

Examples of additional information and/or functionality (e.g., corresponding to UI controls) that be included in a tab for rapid user viewing and access include, dynamic information describing contents of a page associated with the tab; additional metadata detail or metaoperations (information characterizing or indicating how functionality provided by a page is or has been used) characterizing a page associated with a tab, and so on.

Dynamic information may be any information that changes during a time interval of interest, as opposed to static information, which remains fixed during the time interval.

The example system 10 includes one or more client devices 12, such as mobile devices or desktop computers, in communication with a server system 14 that runs webpage software 24 accessible to the client device(s) 12. For the purposes of the present discussion, a mobile device may be any computer, e.g., smartphone, tablet, etc., that is adapted for portable use.

A developer system 42 communicates with the server system 14 and may be employed to develop software for hosting by the server system 14 and for implementing the webpage software 24. The developer system 42 includes a software development kit (also called developer toolset) 44, which includes information tab tools 48 for facilitating designing and developing information tabs. The information tab tools 48 may include code libraries (e.g., libraries with predetermined classes and functions) adapted for use in constructing software to use information tiles.

The developer system 42 further includes a developer UI 46, which may include hardware (e.g., display screen, input/output devices, etc.) and software for facilitating developer access to and use of information and functionality provided by the software development kit.

In general, for the purposes of the present discussion, a UI may be any collection of hardware and/or software adapted to facilitate illustrating data and/or providing access to software functionality associated with the UI. A software UI may be any collection of one or more UI display screens associated with software. Software UI is often characterized by a UI framework or architecture, which specifies an organization of data and functionality of a software application and which may further include features (e.g., information tab structures) for facilitating navigating the software UI.

The example developed server-side webpage software 24 includes Graphical UI (GUI) software 26, which is adapted to communicate with databases 40 (e.g., enterprise databases and applications) via one or more web services and/or Application Programming Interfaces (APIs). The GUI software may further communicate with a database that maintains collected page content 36, pertaining to content of a page or other UI display screen associated with one or more of the tabs 20.

Note that the page content 36 may be derived from one or more of the databases 40 and may be automatically updated when applicable data or content maintained by the databases 40 updates or changes.

The GUI software 26 includes information tab code 28, which may have been developed via the information tab tools 48 of the developer system 42. The example information tab code 28 includes a page analysis module 30 in communication with a page content prioritization module 32 and a tab content generator 34.

The modules 30-34 of the information tab code module 28 facilitate generating instructions for rendering of a web application screen 18 in a browser display screen 16 of the client device 12. The web application screen 18 represents a UI display screen of the web software 24.

In the present example embodiment, the web application screen 18 includes plural vertically arranged information tabs in addition to a UI display screen 22 representing a page of a selected information tab.

For the purposes of the present discussion, a web application may be any computer code, e.g., a software application, which is adapted to be accessed by one or more client devices over a network, such as the Internet or an intranet. A web application may call and/or implement one or more web services.

A web service may be any software function or operation activated or implemented via software running on a server in response to a signal, e.g., a request message, sent from a client to the server via a network, such as the World Wide Web. The software that implements a web service operation may also be called a web service, software service, or simply service herein.

Generally, web applications may be implemented via various methods and accompanying mechanisms, such as Java, JavaScript, Flash, Silverlight, and so on. Furthermore, certain web applications may be defined by a process template that executes several processes, where each process is implemented via a separate web service.

Generally, software services provide functionality, e.g., capabilities, that may be reused by different applications or processes (that may be distributed across a network), which access the functionality via a predetermined interface, e.g., as specified via middleware, and consistent with a service description.

In an example scenario, a user employs the browser UI display screen 16 to browse to a website that runs the webpage software 24. A user then logs into the website, which then runs the GUI software 26 and accompanying information tab code 28 to generate rendering instructions used by the client device 12 and accompanying browser to display the web application screen 18.

The information tab code 28 is adapted to employ the page analysis module 30 to analyze page content 36 associated with each information tab 20, including any metadata associated with the page content 36. Note that the page 22 shown in the web application screen 18 of the client device 12 represents a UI display screen for providing user access to the page content 36.

Examples of metadata (i.e., data about the page content 36) may include measurements of frequency of page access, frequency of use of particular types of UI controls present within the page content, position information indicating where in a page a user left off work before exiting the page or transitioning to another tab (called page position information herein), and so on. Note that the term "metadata" as used herein may include metaoperations (which may include data about operations or actions pertaining to web page content).

For the purposes of the present discussion, page content (also called "information of a page" herein) may include any data and/or software functionality, e.g., as may be user accessible via one or more UI controls, that is included in, linked to, or otherwise accessible via the page.

Software functionality may be any function, capability, or feature, e.g., stored or arranged data, that is provided via computer code, i.e., software. Generally, software functionality may be accessible via use of a UI and accompanying UI controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

An item of content of a page or information tab may be any instance of data and/or UI features, e.g., UI control, that convey information or facilitate user access to functionality via the page or information tab. Examples of items of content of an information tab include page header labels, dynamic visualizations that update in response to changes in data underlying a page, dynamically selected UI controls (e.g., hyperlinks, buttons, etc.), substantially static UI controls, and so on.

The page content prioritization module 32 is adapted to retrieve page analysis information from the page analysis module 30 and rank items of content of the page content 36 in accordance with a predetermined criterion or scheme. The criterion may be based on recency of use of a UI control of the page content 36, frequency of use of certain sections of the page content 36, and so on. Exact details of prioritization methods for prioritizing the importance of different items of content of the page content 36 are implementation specific and may vary, without departing from the scope of the present teachings.

Page analysis information from the page analysis module 30, and page content prioritization information 32 from the page content prioritization module 32 are accessible to the tab content generator 34.

The tab content generator 34 includes computer code for determining which content to include in a tab associated with a page represented by the page content 36, and then generating tab features based on the determination. For example, the tab content generator 34 may employ page content prioritization information to determine the most salient or highest priority features to include in an associated information tab. For instance, the top three most salient features may include alerts for changes in high priority data associated with a page; a UI control corresponding to the most frequently used function or control of the page content 36, and so on. The salient features may then be implemented via one or more lines of information included in the associated information tab 20.

Note that certain embodiments need not rely upon automatic page content prioritization and page analysis operations. For example, a developer using the developer system 42 may preconfigure what information of a page is determined pertinent for inclusion in an information tab, without departing from the scope of the present teachings.

In the present example embodiment, the information tab code 28 is adapted to dynamically respond to changes in page content 36 and associated metadata. For example, if a user accessing the page content 36 via the page 22 of the mobile device 12 begins to use the page content 36 differently or otherwise data maintained therein changes, the associated information tab may be automatically adjusted by the tab content generator 34 in response to the change.

The information shown in the information tabs 20 may include dynamic information, including dynamic summary information and automatically updating or changing UI controls. For the purposes of the present discussion, dynamic information presented via a tab may be any information that is automatically adjusted to reflect one or more changes to a page represented via the tab. Dynamic information of a page may be any information of the page that is adapted to change, e.g., during use of the page or associated application.

Dynamic information may include, for example, live summary information, which illustrates selected automatically updating information characterizing the associated page. The selected information, e.g., metrics and/or page content metadata, may be automatically selected via a software algorithm, e.g., as implemented via the information tab code module 28. Alternatively, or in addition, some dynamic metadata (i.e., dynamic information) may be predetermined by a developer and set in software.

A software algorithm that may be implemented via the webpage software 24 for automatically selecting information items to display in a tab may include: prioritizing content and/or functionality of a page, and selecting a predetermined number of highest priority items to represent via a visualization or other item to be included in the tab.

For the purposes of the present discussion, summary information may be any data or indicators that provide an overview or indication of data that is being summarized by the summary information. Example summary information of a page that may be included in an information tab includes the numbers of tasks associated with a page, completion status of certain tasks, indications (e.g., labels, counts, etc.) of different sections included in a page, page status information, and so on.

In certain embodiments, the summary information preferably includes key information that may be sought by a user, which may be based on analysis of how a user uses a particular page, content of the page, available metadata associated with a page, and so on. Dynamic summary information may be any dynamic information that also indicates or summarizes information of a page associated with the tab.

Note that the use of information tabs as discussed herein differs substantially from conventional thumbnails, tiles, and icons, which often contain relatively static information confined to a single line of information.

Existing tiles, thumbnails, and so on, are often limited in their capacity to convey or provide substantial context information and/or user access to functionality. For example, conventionally, live tile may be implemented as an operating system feature for showing miniaturized versions of a pages or other content associated with the tile. Similarly, static tiles, e.g., as may be displayed in pdf documents and power point documents to facilitate transitioning the display screen to different pages within a document are limited to documents and often merely display static snapshots of document pages associated with the tiles.

However, such conventional tiles are often too small to convey context information from the image displayed in the tiles, and larger tiles may be unsuitable for displaying in various display screens, such as small display screens common on mobile devices, such as smartphones or tablets.

Furthermore, such tiles generally do not act as tabs, such that user selection of a tile may necessitate navigation to the page or document associated with the tile, such that the user loses context information from other tiles and must navigate backward to return to the page listing the tiles to retrieve the context information. This can be particularly problematic for mobile applications, where content immediacy and ease-of-use are often particularly demanded by users.

Those skilled in the art with access to the present teachings will appreciate that certain embodiments discussed herein may be adapted to overcome such shortcomings with conventional UI display screen features.

Figure 2:
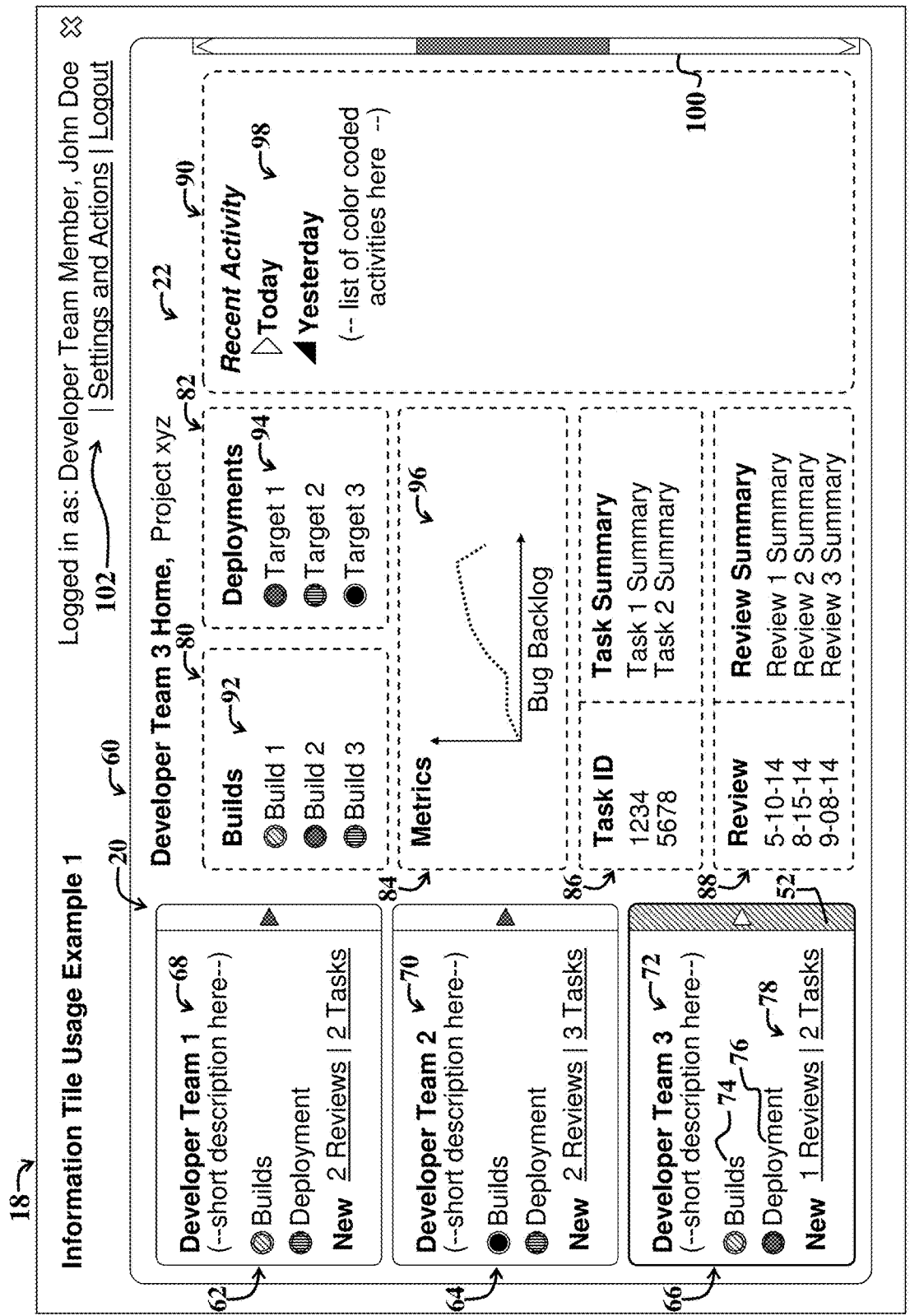
FIG. 2 shows a first example UI display screen, which may be displayed on the client device of FIG. 1, and which illustrates vertically arranged information tabs, including a first selected information tab and its associated UI display screen.

FIG. 2 shows a first example UI display screen 18, which may be displayed on the client device 12 of FIG. 1, and which illustrates vertically arranged information tabs 20, including a first selected information tab 66 and its associated UI display screen 22, also called a page.

The example UI display screen 18 includes a header section 102 indicating a logged in user and providing various user options, such as access to settings and software actions and an option to logout of the underlying software. A primary content section 60 includes the vertically arranged tabs 20 on the left portion of the primary section 60. A right portion of the primary section is used to display a page and associated page content, such as functionality provided via one or more UI controls and data.

The example tabs 20 include a non-selected first tab 62 for facilitating providing user access to data and functionality of a page for a first developer team. A second non-selected tab 74 facilitates user access to data and functionality of a page of a second developer team. The third tab 66, which has been selected by a user, e.g., as illustrated via a visual encoding mechanism, such as via highlighting 52, which represents a selectively darkened right portion of the third tab 66. The highlighting may also include a heaver outline around the selected tab 66.

Note that various mechanisms for highlighting a tab or otherwise visually encoding a tab to indicate a tab's operational status or other status may be used instead of or in addition to the highlighting 52 mechanism, without departing from the scope of the present teachings. For example, tab background, tab size, tab shape, tab orientation, and/or other visual encoding mechanisms may be employed.

For the purposes of the present discussion, visual encoding (also simply called encoding or coding herein) of a data attribute may be any process involving representing the data attribute graphically. For example, if a tab-selection status attribute is used to adjust a size, shape, color, position, highlighting, etc., of a visualization or other UI feature, then the tab-selection status is said to be visually encoded in the visualization or feature.

An attribute of a UI feature, e.g., tab, data visualization, node, or associated data, may be any data or characteristic of data used to generate the UI feature or visualization, where the characteristic may be employed to group or otherwise organize or visually distinguish the data by adjusting features or characteristics of the UI feature or visualization. Additional examples of attributes include data dimensions or layers, such as specified by table headers of tables used to store the data used for a visualization.

Visually encoded information in a UI element or feature is representable via a visual indicator. For the purposes of the present discussion, a visual indicator may be any UI feature or mechanism that is adapted to convey information visually. As suggested above, an example of a visual indicator includes highlighting displayed around a selected UI element, e.g., UI control. Highlighting may involve changes in color, shading, texture, shadowing, and so on, adapted to call user attention to an item or element being highlighted. More complex visual indicators include information visualizations for complex data sets, page status bars, and so on.

Note that despite user selection of the third tab 66, that the non-selected tabs 62, 64 persist in the display screen 18, such that respective content 68, 70 of the tabs 62, 64 remains visible while the page 22 of the selected tab 66 is displayed. This may facilitate immediacy of user access to data and functionality via the underlying software, which can be particularly important for mobile applications, where software navigation using small display screens can be difficult.

In preferred embodiments, information tabs are arranged colinearly, e.g., either horizontally across a top portion of a UI display screen, or vertically along a left portion of a UI display screen. For the purposes of the present discussion, a colinearly arranged set of tabs may be any set of two or more tabs, wherein each tab has one or more edges or centers that are linearly aligned with one or more edges or centers of other tabs of the set of colinearly arranged set of tabs.

Note that while information tabs discussed herein are preferably arranged vertically or horizontal in a UI display screen, embodiments are not limited thereto. For example, tabs may be staggered; positioned along both tops and sides; or otherwise arranged in a UI display screen to meet the needs of a specific implementation.

In the present example embodiment, the selected tab 66 includes various items of tab content 72, including a first visually encoded indicator 74 indicating a status of a highest priority build; a second visually encoded indicator 76 (also called deployment indicator) indicating a status of a highest priority deployment; and a recent event indicator 78, indicating numbers of new reviews and tasks available to the user.

The various items of tab content 72-78 may act as UI controls that also provide summary information, such that the items 72-78. For example, user selection of a user option from the recent event indicator 78 may trigger the associated page 22 to jump to or otherwise highlight an associated section of the page 22.

For example, user selection of "Reviews" may trigger highlighting of a review section 88 of the page 22. If the review section 88 was not currently displayed before user selection of "Reviews," then the page 22 may automatically scroll so that the review section 88 becomes visible in the page 22. The review section 88 of the page 22 may include links to recent reviews indicated by the recent event indicator 78 of the selected tab 66.

Similarly, user selection of "Tasks" from the recent event indicator 78 may trigger highlighting of a task section 86 of the page 22. If the task section 86 was not currently displayed before user selection of "Tasks," then the page 22 may automatically scroll so that the task section becomes visible.

Similarly, user selection of the build indicator 74 of the selected tab 66 may trigger highlighting of and/or may otherwise cause the page to display (if not already viewable) an associated build section 80. Note that the build section includes additional UI controls 92 indicating builds in priority order.

Exact mechanisms for prioritizing the builds 92 (and other page content) are implementation specific and may vary. For example, the builds 92 may be arranged in accordance with frequency of access, recency of access, or based on manual user prioritization, or another scheme, without departing from the scope of the present teachings.

The builds 92 of the build section 80 may be user selectable, such that user selection of one of the builds (e.g., by tapping on, clicking on, etc.) may trigger display of a section detailing more information about the selected build. Furthermore, visual encoding of the builds may automatically adapt to reflect changes in status or other information associated with one or more builds. Such status changes may propagate in the underlying system, resulting in automatic or dynamic updating of the tab content 72.

The deployment indicator 76 and associated deployment targets 94 of a deployment section 82 may behave similarly to the builds indicator 74 and builds 92 of the build section 80, such that user selection of a deployment target 94 from among the prioritized list of targets 94 may result in display of additional information pertaining to the selected target. The additional information may be provided via a dialog box, a hover layer, a transitioning of the page 22, and/or via another mechanism.

Note however, that embodiments discussed herein are not necessarily limited to automatic or dynamic updating of tab content, including data and/or functionality. For example, a user option may be provided to enable a user to refresh tab content at a particular time or at predetermined intervals, without departing from the scope of the present teachings.

Furthermore, note that the builds 92 and deployment targets 94 of the page 22 need not be arranged and displayed in priority order in the page 22 in all implementations. Prioritization of content of the page 22 for selective display of representations of page content in the associated information tab 66 may be determined independently of arrangement of any UI display screen elements or features of the associated page 22.

For illustrative purposes, the page 22 is shown including a metrics section 84, which is adapted to illustrate one or more visualizations or analytics 96, which may be automatically updating in accordance with changes to underlying data. In certain implementations, where metrics of the metrics section 84 are a top priority (e.g., likely to be immediately relevant to a user), then the information tab 66 may be updated with one or more dynamic live graphics or indicators (which may or may not also act as UI controls) reflecting one or more of the metrics and/or associated analytics 96.

For the purposes of the present discussion, an analytic may be any calculation or measurement based on a given input. Certain analytics may be displayed graphically. In general, a graphically displayed analytic or other visual representation of data represents a type of visualization.

An recent activity section 90 provides various user options 98 for viewing current activity streams or blogs, which in certain implementations, may include emails, group postings, build and deployment status updates, and so on. In certain implementations, information from the activity stream 98 can be used to update other content of the page 22, which may then further result in updating of one or more of the tabs 62-66. For example, if a review document is provided in the recent activity stream 98, then this may result in updating of the recent activity indicator 78 of the selected tab 66.

Note that in the present example embodiment, a tab need not be selected for tab content to be automatically updated. However, if the user makes changes affecting content of the page 22, this may or may not be reflected in an adjustment to the content of the associated information tab 66.

Note that the content of the page 22 is merely illustrative and may vary depending upon the needs of a given implementation. For example, a scroll bar 100 may be employed to scroll the page 22 and/or the entire section 60, to reveal additional page information and/or UI controls.

Note that the tab content 72 is arranged in plural lines of information 74-78. For the purposes of the present discussion, a line of information may be any row or column of elements (e.g., items of data, UI controls, visualizations, pictures, etc.) that is organized by row and/or column. Note that such rows or columns are not limited by horizontal or vertical arrangement, e.g., a set of rows and/or columns may be angled across a display region, without departing from the scope of the present teachings.

In general, the tabs 62-64 display pertinent information, e.g., as determined with reference to user specific criteria and/or prioritization mechanisms. In general, as suggested above, the importance or pertinence of information or items of content of a page, which are to be candidates for summarization or indication in an information tab, may be established via criteria, such as frequency of use, recency of use or access, or other criteria. Such criteria may be user selected, developer selected, or software selected (called dynamic or automatic selection) based on predetermined algorithms.

Figure 3:
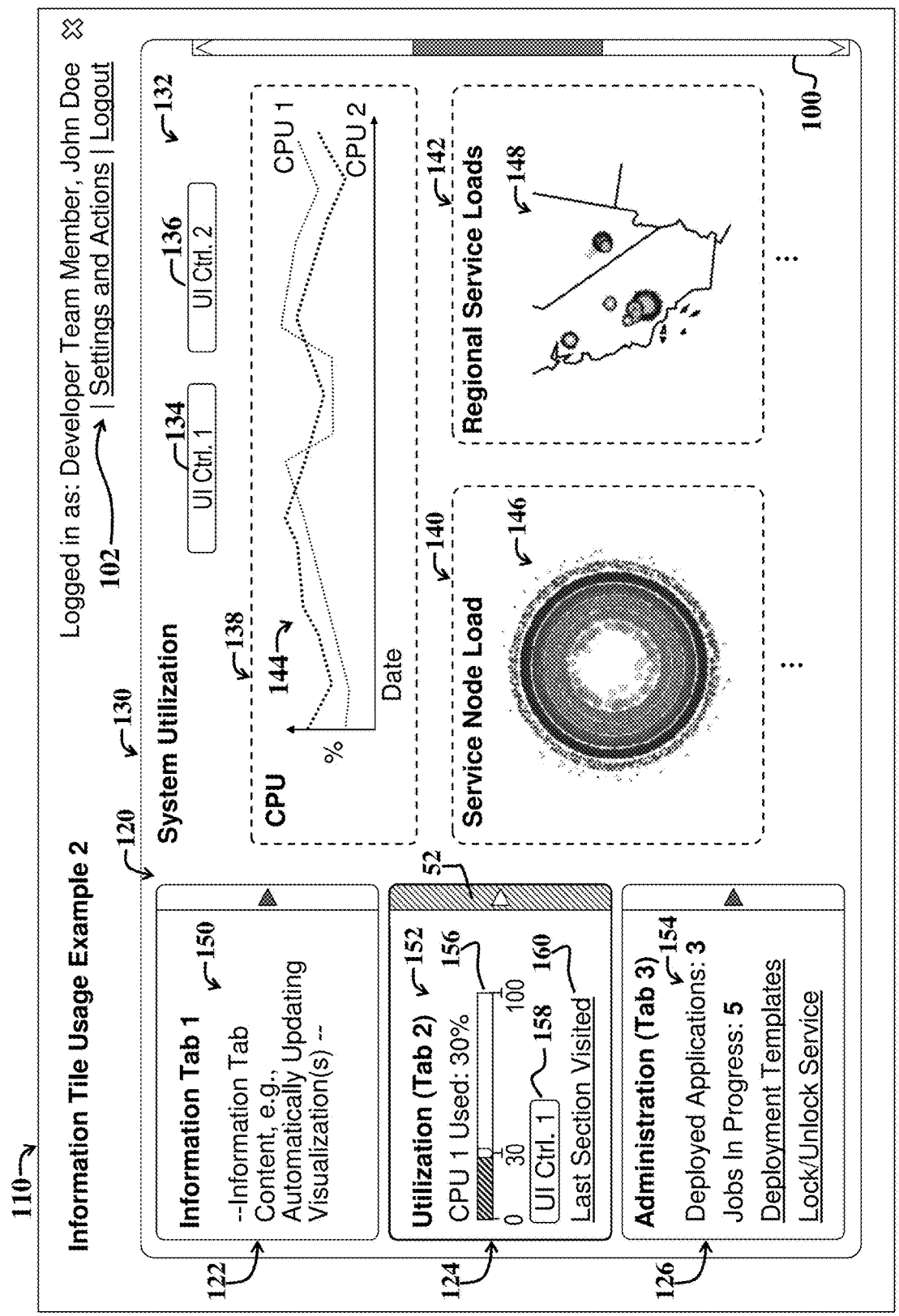
FIG. 3 shows a second example UI display screen with dynamic tabs that include indicators that adjust in accordance with changes in underlying data used to display visualizations of a UI display screen associated with one of the dynamic tabs.

FIG. 3 shows a second example UI display screen 110 with dynamic tabs 120 that include indicators 150-160 that adjust in accordance with changes in underlying data used to display visualizations of a UI display screen (i.e., page 132) associated with the dynamic tabs 120.

The information tabs 120 include a first information tab 122, a selected utilization tab 124, and an administration tab 126. The selected utilization tab 124 includes dynamic tab content 152, including an automatically updating Central Processing Unit (CPU) utilization visualization 156. A second tab content item includes a frequently used UI control 158 (representing a most frequently accessed UI control of the displayed page 132). A third tab content item includes a last-section-visited control 160, which provides an indication and user option for rapid user access to the last section visited or selected by a user of the page 132. Note that the non-selected tabs 122, 126 may also include automatically updating tab content 150, 154.

The example page 132 includes various dynamic content arranged in a CPU section 138, a service node load section 140, and a regional service loads section 142. The various sections 138-142 include live or dynamically updating visualizations 144-148, respectively. Updates to information underlying visualizations and/or updates to metadata and/or metaoperations data may propagate to the utilization tab 124. For example, changes to data depicted via the CPU utilization graphs 144 may result in automatic updating of the graphs 144 and the representative visualization 156 of the utilization tab 124.

For illustrative purposes, the example dynamic page 132 further includes a first UI control 134 and a second UI control 136. The underlying system is adapted to measure how frequently the UI controls 134, 136 are used (and this information may be called metadata or metaoperations data), and then prioritizes the most frequently used control, resulting in a representation 158 of the most frequently used control 134 appearing in the utilization tab 152.

Figure 4:
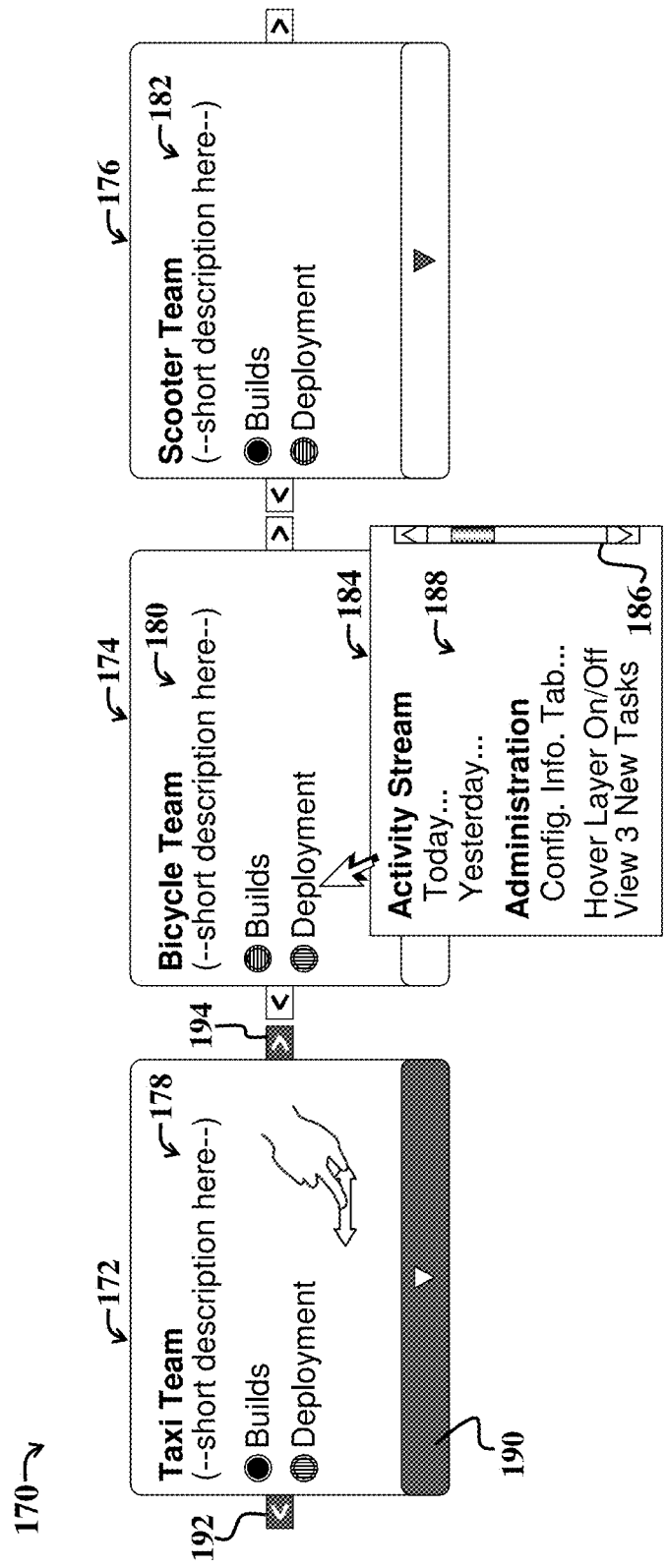
FIG. 4 shows a third example UI display screen showing a horizontal arrangement of information tabs.

FIG. 4 shows a third example UI display screen 170 showing a horizontal arrangement of information tabs 172-176 and associated tab content 178-182.

An example selected tab 172 includes highlighting 190 indicating that the tab 172 is selected. The selected tab also includes optional scroll tabs 192, 194, which are adapted to enable a user to scroll tab content 178. Alternatively, a user may employ swiping motion on a touch screen to scroll tab content 178.

Note that in many implementations, a user option to scroll content 178 of a tab need not be provided, as tab content 178 may be adequately displayed within the boundaries of the tab 172 without requiring scrolling to reveal additional tab content.

The example tabs 172-176 include a second example tab 180, which has been augmented with a hover layer feature, whereby a mouse-over (or tap-and-hold gesture) of the tab 174 may reveal additional tab content and/or user options or controls 188 in a hover layer 184. An optional scroll bar 186 facilitates scrolling of the hover layer 184.

Example user options illustrated in the hover layer 184 are merely illustrative and may vary. For example, additional user options, such as a user option to adjust persistence behavior of a tab may be provided. Furthermore, hover layer functionality may be omitted, without departing from the scope of the present teachings.

Figure 5:
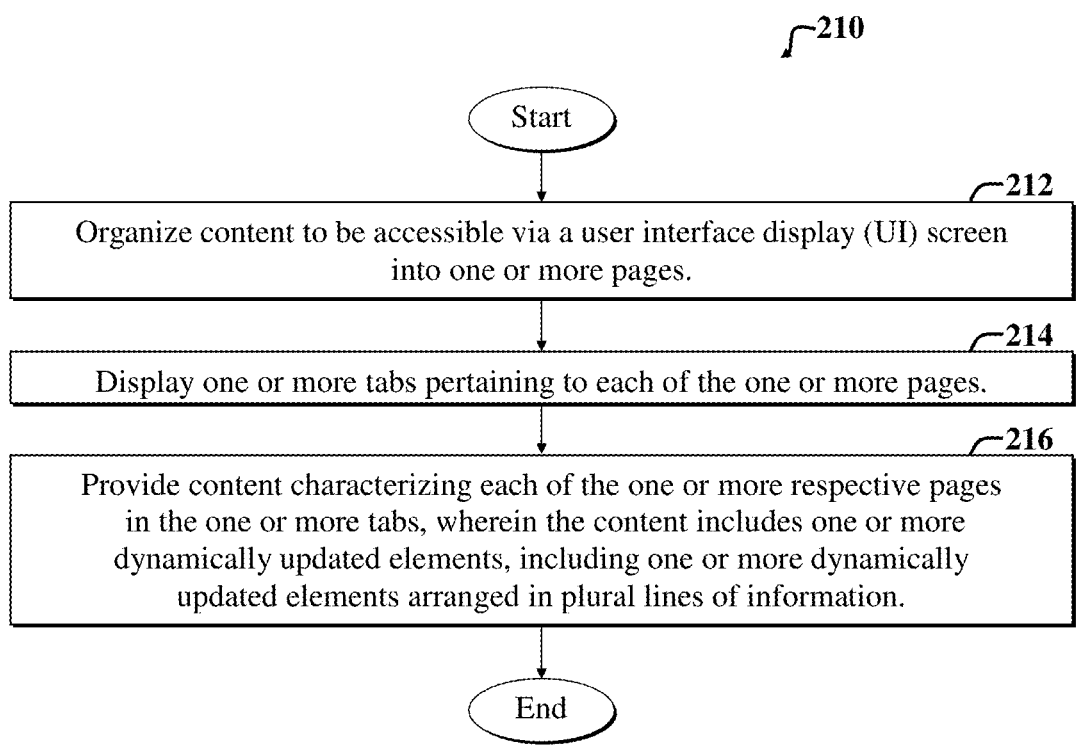
FIG. 5 is a flow diagram of a first example method adapted for use with the embodiments of FIGS. 1-5.

FIG. 5 is a flow diagram of a first example method 210 adapted for use with the embodiments of FIGS. 1-5. The example method 210 is adapted to facilitate organization of and access to information and/or functionality in a computing environment.

A first step 212 includes organizing content to be accessible via a UI display screen into one or more pages.

A second step 214 includes displaying one or more tabs pertaining to each of the one or more pages.

A third step 216 includes providing, in one or more of the tabs, content characterizing each of the one or more pages. The tab content includes one or more dynamically updated elements, including one or more dynamically updated elements arranged in plural lines of information.

Note that the first method 210 may be augmented or adjusted, without departing from the scope of the present teachings. For example, the method 210 may further include presenting dynamic information in an information tab using one or more visualizations and/or UI controls.

For example, the content includes one or more UI controls that are adapted to provide user access to software functionality applicable to a page. The one or more dynamically updated elements may include one or more UI controls associated with the software functionality.

The example method 210 may further include analyzing of, including monitoring content of, a page to determine changed content based on the analyzing. The method 210 may further include prioritizing page content in accordance with frequency and/or recency of use of (or otherwise selection of) a UI control of the page that includes the changed content.

Items of content of a page may be ranked in priority order, with a predetermined number of highest priority items chosen for representation in an associated information tab. For example, a UI control in a particular information tab may include a representation of a UI control that has been most frequently used or most recently used, accessed, or otherwise selected.

The first example method 210 may further include incorporating page metadata into an associated information tab, where the metadata includes summary information pertaining to a page associated with an information tab. The metadata may further include page position information indicating a most recently viewed section of a page.

One or more information tabs may be adapted to provide hover layer functionality in response to user selection of a UI control of one or more of the information tabs. The UI control (e.g., corresponding to a "hover layer on/off" UI control of the hover layer 184 of FIG. 4) may represent a user option to trigger display of a hover layer in response to user selection of the UI control. Alternatively, hover layer functionality may be automatic; and/or may be globally adjusted via a settings layer; and or may be activated or used via a tap-and-hold gesture or mouse-over gesture, and so on.

Figure 6:
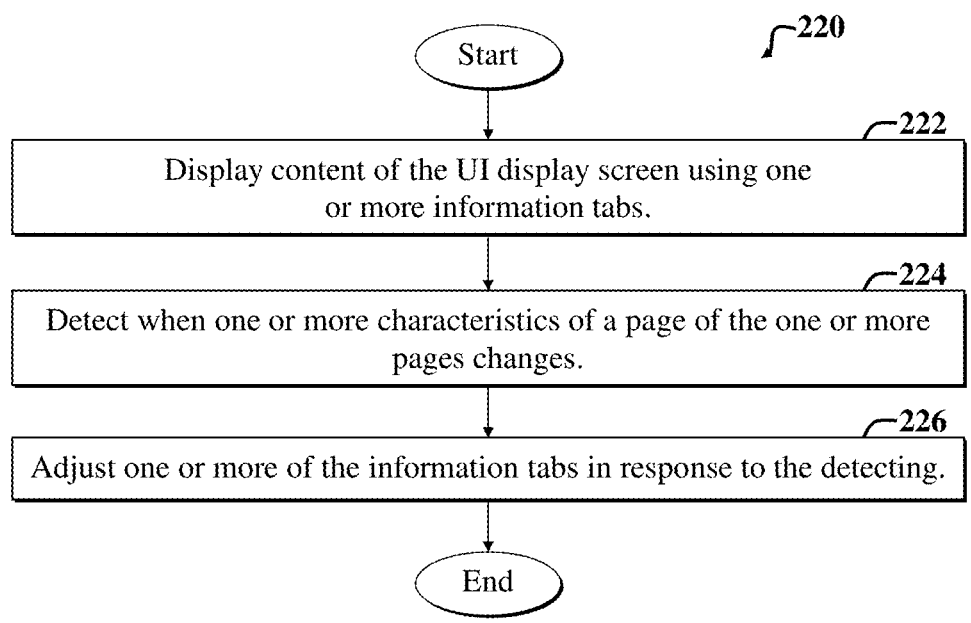
FIG. 6 is a flow diagram of a second example method adapted for use with embodiments of FIG. 1-5.

FIG. 6 is a flow diagram of a second example method 220 adapted for use with embodiments of FIG. 1-5. The second example method 220 is adapted to facilitate organizing one or more elements of a UI display screen.

An initial content-displaying step 222 includes displaying content of a UI display screen using one or more information tabs.

A detection step 224 includes detecting when one or more characteristics of a page of the one or more pages changes.

An adjustment step 226 includes adjusting one or more items of content of an information tab in response to the detection of a change in one or more page characteristics, e.g., underlying data and/or metadata.

Figure 7:
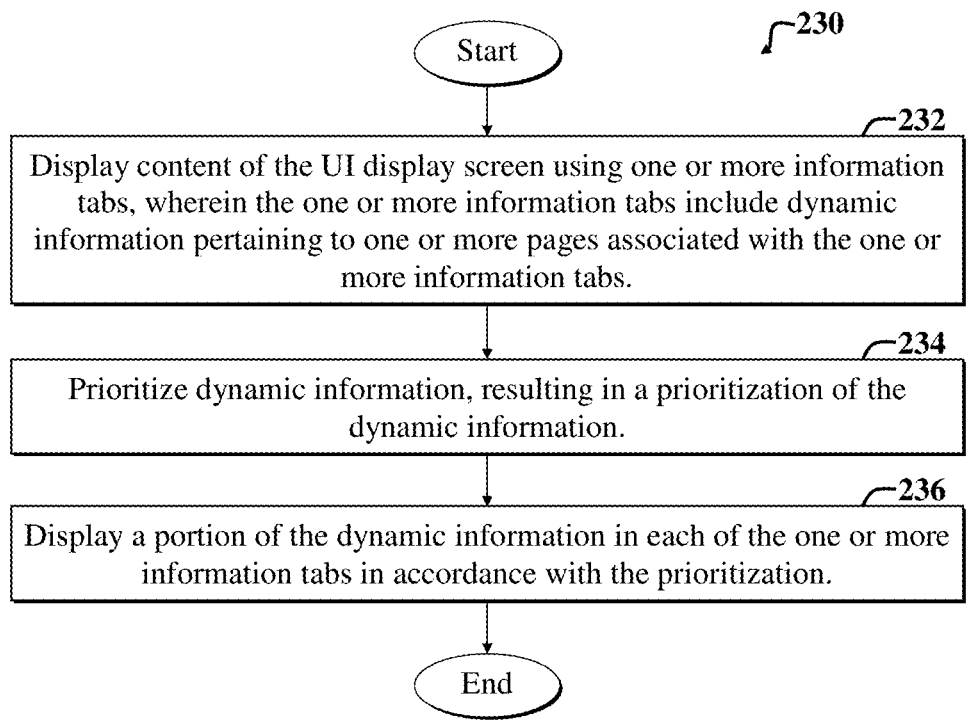
FIG. 7 is a flow diagram of a third example method adapted for use with the embodiments of FIGS. 1-5

FIG. 7 is a flow diagram of a third example method 230 adapted for use with the embodiments of FIGS. 1-5. The third example method 230 is adapted to facilitate organizing one or more elements of the UI display screen.

A first displaying step 232 includes displaying content of the UI display screen using one or more information tabs. The one or more information tabs include dynamic information pertaining to one or more pages associated with the one or more information tabs.

A prioritization step 234 includes prioritizing dynamic information, resulting in a prioritization of the dynamic information.

A second displaying step 236 includes displaying a portion of the dynamic information in each of the one or more information tabs in accordance with the prioritization.

Although the description has been described with respect to particular embodiments thereof, these particular embodiments are merely illustrative, and not restrictive. For example, while certain embodiments are adapted for use with mobile device displays and associated graphical user interfaces, embodiments are not limited thereto. For example, a software application running on standalone desktop computer may be adapted to use information tabs as discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A client device operating in a system including one or more client devices in communication with a server system, wherein the server system executes webpage software, wherein the webpage software provides webpage information accessible to the client device, the following steps executed by the client device:

organizing content to be accessible via a user interface (UI) into pages, the content including information obtained from one or more databases, wherein sections are associated with the pages and wherein each of the pages has one or more of the sections;

displaying tabs pertaining to the pages, wherein there is a one to one correspondence between the tabs and the pages and wherein one of the tabs is a selected tab;

displaying a page of the pages, wherein the displayed page is visible and is for the selected tab;

providing, in the tabs, the content including characterizations of each of the pages, wherein the content includes one or more dynamically updated elements, wherein each of the tabs includes a subset of the dynamically updated elements, wherein each of the subsets of the dynamically updated elements within corresponding ones of the tabs are arranged in plural lines of information, wherein the dynamically updated elements and the tabs have an arrangement adjacent to the pages, wherein selection of each of the tabs is for displaying a separate one of the pages, wherein each of the dynamically updated elements corresponds with different ones of the sections of the pages, and wherein the dynamically updated elements are stacked vertically;

updating first particular content in one of the elements displayed on the selected tab based on first updates to the displayed page, wherein the arrangement remains the same;

updating second particular content in one of the elements displayed on a non-selected tab based on second updates to a non-displayed page, wherein the non-selected tab is one of the tabs, wherein the arrangement remains the same, wherein the tabs include plural information tabs, and further including arranging the plural information tabs collinearly, either horizontally or vertically, and further including detecting user selection of one of the tabs, and displaying a visual indicator that indicates that the selected tab has been selected, wherein the visual indicator includes a highlighting of at least a portion of the selected tab;

incorporating page metadata into the tab associated with the displayed page, wherein the page metadata includes page position information indicating a most recently viewed section of the displayed page;

prioritizing changed content in accordance with frequency of use of a UI control of the displayed page that includes the changed content, wherein the prioritizing further includes ranking items of content of the displayed page in accordance with the frequency of use and a number of the ranking items is a predetermined number of highest priority items chosen for representation of the selected tab associated with the displayed page, wherein the changed content includes the first particular content and the second particular content;

receiving selection of a dynamically updated element of the dynamically updated elements, wherein the selected dynamically updated element corresponds with a particular section of the sections, and wherein the particular section is in a particular page of the pages;

displaying the particular page, and scrolling to and highlighting the particular section of the particular page in response to the selection of the dynamically updated element;

displaying links in the particular section, wherein the links correspond with the selected dynamically updated element; and concurrently displaying the tabs throughout navigation of the user interface including selection and display of the pages, the tabs, and the content.

2. The client device of claim 1, wherein the content includes dynamic information represented via one or more visualizations.

3. The client device of claim 1, wherein the content includes one or more UI controls that are adapted to provide user access to software functionality applicable to the displayed page of the pages, and wherein the one or more dynamically updated elements include one or more UI controls associated with the software functionality.

4. The client device of claim 3, further including analyzing content of the displayed page and determining changed content based on the analyzing.

5. The client device of claim 4, wherein the one or more UI controls displayed in the tabs includes a representation of a UI control that has been most frequently used during a predetermined interval.

6. The client device of claim 4, wherein the one or more UI controls include a representation of a UI control that was last selected by a user from the displayed page associated with an information tab, wherein the information tab is the selected tab.

7. The client device of claim 3, wherein the content further includes metadata characterizing each of the pages.

8. The client device of claim 7, wherein the metadata includes summary information pertaining to the displayed page associated with an information tab.

9. The client device of claim 7, wherein the one or more UI controls include a link to a portion of the displayed page corresponding to most recently viewed section of the displayed page.

10. The client device of claim 3, wherein the content includes a visualization that is adapted to selectively update in response to changes in data that underlies the displayed page associated with an information tab.

11. The client device of claim 3, further including analyzing content of the displayed page to estimate which UI controls of the displayed page are used more frequently than other UI controls of the displayed page, and providing a selected UI control in an information tab associated with the displayed page, wherein functionality associated with the selected UI control is similar to functionality provided via one or more UI controls in the displayed page that have been determined, based on the analyzing, to represent a UI control of the more frequently used ones of the UI controls of the displayed page.

12. The client device of claim 1, wherein the tabs include one or more information tabs that are adapted to provide hover layer functionality that is adapted to facilitate illustrating content associated with a tab.

13. The client device of claim 1, wherein the tabs include one or more information tabs that are adapted to provide a user option to scroll content illustrated in an information tab.

14. The client device of claim 1, wherein the client device is further adapted to facilitate organizing one or more elements of the UI, the client device further including:
displaying content of the UI using one or more information tabs, wherein the one or more information tabs include information pertaining to one or more pages associated with the one or more information tabs;
prioritizing the information, resulting in a prioritization of the information;
displaying a portion of the information in each of the one or more information tabs in accordance with the prioritization; and
detecting when one or more characteristics of the displayed page changes, thereby resulting in a change in the information, and
adjusting content in one or more of the information tabs in response to the detecting, wherein the arrangement remains the same as part of the adjusting of the content in the one or more of the information tabs.

15. An apparatus operating in a system including one or more client devices in communication with a server system, wherein the server system executes webpage software, wherein the webpage software provides webpage information accessible to the client device, the apparatus comprising:
a digital processor coupled to a display and to a processor-readable storage device, wherein the processor-readable storage device includes one or more instructions executable by the digital processor to perform the following acts:
organizing content to be accessible via a user interface (UI) into pages, the content including information obtained from one or more databases, wherein sections are associated with the pages and wherein each of the pages has one or more of the sections;
displaying tabs pertaining to the pages, wherein there is a one to one correspondence between the tabs and the pages and wherein one of the tabs is a selected tab;
displaying a page of the pages, wherein the displayed page is visible and is for the selected tab;
providing, in the tabs, the content including characterizations of each of the pages, wherein the content includes one or more dynamically updated elements, wherein each of the tabs includes a subset of the dynamically updated elements, wherein each of the subsets of the dynamically updated elements within corresponding ones of the tabs are arranged in plural lines of information, wherein the dynamically updated elements and the tabs have an arrangement adjacent to the pages, wherein selection of each of the tabs is for displaying a separate one of the pages, wherein each of the dynamically updated elements corresponds with different ones of the sections of the pages, and wherein the dynamically updated elements are stacked vertically;
updating first particular content in one of the elements displayed on the selected tab based on first updates to the displayed page, wherein the arrangement remains the same;
updating second particular content in one of the elements displayed on a non-selected tab based on second updates to a non-displayed page, wherein the non-selected tab is one of the tabs, wherein the arrangement remains the same,
wherein the tabs include plural information tabs, and further including arranging the plural information tabs collinearly, either horizontally or vertically, and further including detecting user selection of one of the tabs, and displaying a visual indicator that indicates that the selected tab has been selected, wherein the visual indicator includes a highlighting of at least a portion of the selected tab;
incorporating page metadata into the tab associated with the displayed page, wherein the page metadata includes page position information indicating a most recently viewed section of the displayed page;
prioritizing changed content in accordance with frequency of use of a UI control of the displayed page that includes the changed content, wherein the prioritizing further includes ranking items of content of the displayed page in accordance with the frequency of use and a number of the ranking items is a predetermined number of highest priority items chosen for representation of the selected tab associated with the displayed page, wherein the changed content includes the first particular content and the second particular content;
receiving selection of a dynamically updated element of the dynamically updated elements, wherein the selected dynamically updated element corresponds with a particular section of the sections, and wherein the particular section is in a particular page of the pages;
displaying the particular page, and scrolling to and highlighting the particular section of the particular page in response to the selection of the dynamically updated element;
displaying links in the particular section, wherein the links correspond with the selected dynamically updated element; and
concurrently displaying the tabs throughout navigation of the user interface including selection and display of the pages, the tabs, and the content.

16. A non-transitory computer readable medium for a client device operating in a system including one or more client devices in communication with a server system, wherein the server system executes webpage software, wherein the webpage software provides webpage information accessible to the client device, the non-transitory computer readable medium including instructions executable by a digital processor, the non-transitory computer readable medium including one or more instructions for:
organizing content to be accessible via a user interface (UI) into pages, the content including information obtained from one or more databases, wherein sections are associated with the pages and wherein each of the pages has one or more of the sections;

displaying tabs pertaining to the pages, wherein there is a one to one correspondence between the tabs and the pages and wherein one of the tabs is a selected tab;

displaying a page of the pages, wherein the displayed page is visible and is for the selected tab;

providing, in the tabs, the content including characterizations of each of the pages, wherein the content includes one or more dynamically updated elements, wherein each of the tabs includes a subset of the dynamically updated elements, wherein each of the subsets of the dynamically updated elements within corresponding ones of the tabs are arranged in plural lines of information, wherein the dynamically updated elements and the tabs have an arrangement adjacent to the pages, wherein selection of each of the tabs is for displaying a separate one of the pages, wherein each of the dynamically updated elements corresponds with different ones of the sections of the pages, and wherein the dynamically updated elements are stacked vertically;

updating first particular content in one of the elements displayed on the selected tab based on first updates to the displayed page, wherein the arrangement remains the same;

updating second particular content in one of the elements displayed on a non-selected tab based on second updates to a non-displayed page, wherein the non-selected tab is one of the tabs, wherein the arrangement remains the same, wherein the tabs include plural information tabs, and further including arranging the plural information tabs collinearly, either horizontally or vertically, and further including detecting user selection of one of the tabs, and displaying a visual indicator that indicates that the selected tab has been selected, wherein the visual indicator includes a highlighting of at least a portion of the selected tab;

incorporating page metadata into the tab associated with the displayed page, wherein the page metadata includes page position information indicating a most recently viewed section of the displayed page;

prioritizing changed content in accordance with frequency of use of a UI control of the displayed page that includes the changed content, wherein the prioritizing further includes ranking items of content of the displayed page in accordance with the frequency of use and a number of the ranking items is a predetermined number of highest priority items chosen for representation of the selected tab associated with the displayed page, wherein the changed content includes the first particular content and the second particular content;

receiving selection of a dynamically updated element of the dynamically updated elements, wherein the selected dynamically updated element corresponds with a particular section of the sections, and wherein the particular section is in a particular page of the pages;

displaying the particular page, and scrolling to and highlighting the particular section of the particular page in response to the selection of the dynamically updated element;

displaying links in the particular section, wherein the links correspond with the selected dynamically updated element; and concurrently displaying the tabs throughout navigation of the user interface including selection and display of the pages, the tabs, and the content.

17. The client device of claim 1, wherein at least one of the dynamically updated elements includes dynamic key information that is sought by a user and based on analysis of how the user uses the particular page, content of the particular page, and available metadata associated with the particular page.

18. The client device of claim 1, wherein the first updates to the displayed page pertain to central processing unit (CPU) usage.

19. The client device of claim 1, wherein the following steps executed by the client device further including:

providing user interface display screens in the user interface, wherein each of the display screens includes a primary content section, wherein each of the primary content section includes the tabs in one portion of the primary content section and one of the pages in another portion of the primary content section, and wherein each of the user interface display screens includes a header section that indicates a user logged into the user interface, wherein the pages include at least a developer team page and a system utilization page, wherein the tabs include a developer team tab, an information tab, a utilization tab, an administration tab, a taxi team tab, a bicycle team tab, a scooter team tab, and an activity stream tab;

detecting selection of a developer team tab for the developer team page, wherein the developer team tab includes a highest priority build indicator, a deployment indicator, a highest priority development indicator, and a recent activity indicator, wherein the recent activity indicator includes a recent reviews user option and a recent tasks user option, wherein the developer team page includes a review section, a task section, a build section, a deployment section, a recent activity section, and a metrics section, wherein the review section includes links to recent reviews indicated by the recent activity indicator, wherein the metrics section depicts top priority metrics including dynamic live graphics that are automatically updated based on changes of underlying data, and wherein the recent activity section includes user options for reviewing emails, group postings, and build and deployment status updates;

updating the recent activity indicator of the developer team tab based on a recent activity stream associated with the recent activity section;

displaying the developer team page in response to the detecting the selection of the developer team tab;

detecting selection of the utilization tab for the system utilization page, wherein the utilization tab includes a central processing unit (CPU) utilization visualization, a frequently used UI control representing a most frequently accessed UI control of the system utilization page, and a last-section-visited control providing an indication and user option for rapid user access to last selection visited by a user of the system utilization page;

displaying the system utilization page in response to the detecting of the selection of the utilization tab, wherein the system utilization page includes a CPU section, a service node load section, and a regional service load section, wherein the CPU section includes dynamically updating CPU utilization graph, the service node load section includes a dynamically updating service node load graph, and the regional service load section includes a dynamically updating regional map reflecting service loads;

updating a CPU utilization visualization in the utilization tab based on changes to a CPU utilization graph in the CPU section of the system utilization page;

providing a tab operation status mechanism that indicates when one of the tabs is selected by one or more of highlighting the selected tab, changing background of the selected tab, changing size of the selected tab, changing shape of the selected tab, changing orientation of the selected tab;

providing one or more of the dynamically updated elements with a visual indicator selected from one or more of changing color, changing shading, and changing texture;

scrolling to and highlighting the review section of the developer team page in response to detecting selection of the recent reviews user option of the developer team tab, wherein the review section includes one or more review summaries and review dates;

scrolling to and highlighting the task section of the developer team page in response to detecting selection of the recent tasks user option of the developer team tab, wherein the task section includes one or more task summaries and corresponding task identifiers;

scrolling to and highlighting the build section in response to detecting selection of the highest priority build indicator of the development team tab, wherein the build section depicts builds in priority order and changes in status of one or more builds;

scrolling to and highlighting the deployment section in response to detecting selection of the deployment indicator, wherein the deployment section displays a prioritized list of targets for deployments;

displaying additional information pertaining to a selected one of the targets for the deployments;

providing a refresh user option to refresh content for one or more of the tabs at a particular time;

determining which of a first UI control and a second UI control is a most frequently used UI control in the system utilization page; and depicting a representation in the utilization tab of the most frequently used UI control, wherein one or more of the dynamically updated elements are visually encoded with one or more of the indicators.

* * * * *